United States Patent Office 3,171,858
Patented Mar. 2, 1965

3,171,858
α-ETHYLAMINO-o-METHYLISOBUTYROPHENONE
Yvon J. L'Italien, Plymouth, Mich., assignor to Parke, Davis & Company, Detroit, Mich., a corporation of Michigan
No Drawing. Filed Aug. 30, 1963, Ser. No. 305,868
4 Claims. (Cl. 260—570.5)

The present invention relates to α-ethylamino-o-methylisobutyrophenone of the formula

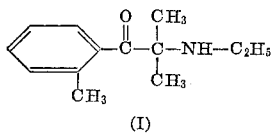

(I)

to non-toxic acid-addition salts thereof, and to methods for their production.

In accordance with the invention, α-ethylamino-o-methylisobutyrophenone and acid-addition salts thereof are produced by the reaction of α-amino-o-methylisobutyrophenone with an ethylating agent. Among the ethylating agents which can be used are ethyl halides, diethyl sulfate, ethyl benzenesulfonate, ethyl p-toluenesulfonate and the like. The reaction is preferably carried out in a solvent. Suitable solvents are ketones, such as acetone; alcohols; amides, such as N,N-dimethylformamide; ethers, such as tetrahydrofuran; and hydrocarbons; mixtures of these may also be used. It is preferable to carry out the reaction in the presence of an acid acceptor, such as an alkali metal hydroxide, an alkaline earth hydroxide, an alkali metal carbonate, or an organic amine. While equivalent quantities of reactants may be used, it is preferable to employ an excess of the ethylating agent. The temperature and duration of the reaction are not critical, and may be varied from 25° to 100° C. for a period of 2 to 24 hours. The product of this reaction may be isolated either as the free base or as an acid-addition salt by treating a solution of the free base with an excess of a suitable acid, such as hydrochloric acid.

The α-amino-o-methylisobutyrophenone employed as starting material in the foregoing process can be prepared by the following sequence of reactions. o-Methylisobutyrophenone is reacted with unsymmetrical dimethylhydrazine under reflux in glacial acetic acid solution to prepare o-methylisobutyrophenone, dimethylhydrazone. This product is reacted with an excess of methyl iodide in the cold to prepare o-methylisobutyrophenone, dimethyl hydrazone, methiodide. Reaction of the methiodide with sodium isopropoxide in isopropanol solution under reflux followed by treatment with aqueous mineral acid gives the desired α-amino-o-methylisobutyrophenone.

Also in accordance with the invention, α-ethylamino-o-methylisobutyrophenone and acid-addition salts thereof are prepared by the reaction of a 1,2-epoxy-1-lower alkoxy-2-methyl-1-(o-tolyl)-propane compound of the formula

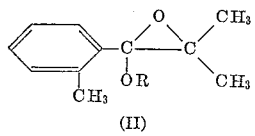

(II)

with ethylamine, and, if desired, treating the free base obtained with an acid; where R is a lower alkyl radical. The reaction may be carried out in the presence of a solvent or diluent, but it is preferable to employ no solvent. Equivalent quantities of reactants may be used; for best yields, however, a five- to ten-fold molar excess of ethylamine is employed. The reaction is preferably carried out at an elevated temperature in the range of 150°–225° C. in a closed vessel over a period of from 3 to 48 hours. Under the usual conditions, the reaction is substantially complete in approximately 24 hours at a temperature of 175° C.

The 1,2-epoxy-1-lower alkoxy-2-methyl-1-(o-tolyl)-propane compound used as starting material in this process can be obtained by reacting an α-halo-o-methylisobutyrophenone compound of the formula

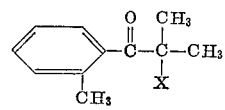

(III)

with an alkali metal alkoxide in an organic solvent, preferably the alcohol used in the preparation of the alkali metal alkoxide. In Formula III, X represents a halogen atom. The temperature of this reaction is not critical, and the reflux temperature of the solvent is normally used. Equivalent quantities of reactants or a slight excess of alkali metal alkoxide may be used. The α-halo-o-methylisobutyrophenone of Formula III can be obtained by the reaction of o-methylisobutyrophenone with a halogen, preferably bromine, in a halogenated solvent, such as carbon tetrachloride.

In accordance with yet another process of the invention, α-ethylamino-o-methylisobutyrophenone and acid-addition salts thereof are prepared by the reaction of 1-(o-tolyl)-2-methyl-2-ethylamino-1-propanol, having the formula

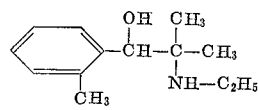

(IV)

with an oxidizing agent. Oxidizing agents suitable for converting the hydroxyl group to a ketone include chromic acid, alkali metal dichromates, such as sodium dichromate or potassium dichromate, and tertiary-butyl hypochlorite. The oxidation can be carried out in a halogenated hydrocarbon solvent, such as carbon tetrachloride, but is preferably accomplished in an aqueous solvent containing a mineral acid, in which case the aminoalcohol of Formula IV is present in the form of an acid-addition salt. The oxidation reaction proceeds at a satisfactory rate at room temperature and lower, but any temperature in the range from 0° to 50° C. may be satisfactorily employed. Completion of the reaction is facilitated by using a slight excess of the oxidizing agent. The desired α-ethylamino-o-methylisobutyrophenone is conveniently isolated by making the reaction mixture basic and extracting with an organic solvent. The product can then be isolated as the free base by distillation of the organic extract, or as an acid-addition salt by treatment of the organic extract with an acid.

The 1-(o-tolyl)-2-methyl-2-ethylamino-1-propanol employed as starting material in the foregoing process can be prepared by the following sequence of reactions. o-Methylisobutyrophenone is reduced by means of lithium aluminum hydride in ether to 1-(o-tolyl)-2-methyl-1-propanol. This alcohol is dehydrated by reaction with a slight excess of p-toluenesulfonic acid in toluene to give 1-(o-tolyl)-2-methyl-1-propene. The olefin is epoxidized by treatment with perbenzoic acid at room temperature in a halogenated solvent, such as chloroform, and the o-(1,2-epoxyisobutyl)-toluene obtained is heated at 100°–200° C. together with ethylamine and an alcoholic solvent in a sealed reaction vessel to produce the desired 1-(o-tolyl)-2-methyl-2-ethylamino-1-propanol.

The free base compound of the invention, namely, α-ethylamino-o-methylisobutyrophenone, forms non-toxic acid-addition salts by reaction with a variety of inorganic and organic acids. Non-toxic acid-addition salts are formed by reaction of the free base with acids such as hydrochloric, hydrobromic, sulfuric, nitric, acetic, citric, tartaric, sulfamic and the like.

The compounds of the invention are of value as pharmacological agents. They exhibit an appetite-depressant effect, and hence are useful in weight control. They are also anti-arrhythmia agents of value in controlling abnormal heart rhythm. In such applications, they are essentially devoid of central nervous system stimulant effects and of hypotensive effects. The compounds of the invention may be administered orally or parenterally.

The invention is illustrated by the following examples:

Example 1

A mixture of 49 g. of α-amino-o-methylisobutyrophenone, 45 g. of anhydrous potassium carbonate, 50 g. of ethyl iodide, and 200 ml. of dry acetone is heated under reflux with stirring for 18 hours overnight. The mixture is allowed to cool, the inorganic salts are removed by filtration, and the bulk of the solvent is removed by evaporation under reduced pressure. The residue is dissolved in ether, and the ether solution is washed three times with water, and extracted with dilute hydrochloric acid. The acidic solution is washed once with ether, and made basic with aqueous sodium hydroxide solution to precipitate α-ethylamino-o-methylisobutyrophenone as the free base. The free base is dissolved in ether, and the ether solution is washed with water and dried over anhydrous potassium carbonate. The dried solution is treated with a saturated solution of hydrogen chloride in isopropanol, and the solid α-ethylamino-o-methylisobutyrophenone hydrochloride obtained is crystallized twice from isopropanol; M.P. 197–199° C.

The hydrobromide salt of α-ethylamino-o-methylisobutrophenone is obtained by treating a solution of the free base in anhydrous ether with a slight excess of dry hydrogen bromide in isopropanol. The insoluble precipitate is collected and recrystallized from a mixture of isopropanol and ether to afford the purified hydrobromide, which is soluble in water, insoluble in ether and benzene.

The α-amino-o-methylisobutyrophenone used as starting material in the above procedure is prepared as follows: A mixture of 354 g. of o-methylisobutyrophenone, 420 g. of unsymmetrical dimethylhydrazine, and 110 ml. of glacial acetic acid is heated under reflux for 41 hours. The mixture is cooled and diluted with one liter of ether and 750 ml. of water containing 80 g. of sodium hydroxide. After thorough shaking, the ether layer is separated, dried over anhydrous magnesium sulfate, filtered and evaporated to dryness on the steam bath. The residue is distilled under reduced pressure to give 429 g. of o-methylisobutyrophenone, dimethyl hydrazone, B.P. 116–121° C./17 mm. Hg. This product (429 g.) is dissolved in 500 ml. acetonitrile, 400 g. of methyl iodide is added, and the solution is kept in an ice bath for three days. After warming to room temperature, the mixture is diluted with one liter of ether with vigorous stirring, and the precipitated o-methylisobutyrophenone, dimethyl hydrazone, methiodide is isolated, washed with ether, and dried under reduced pressure at 50° C.; M.P. 171–174° C. The methiodide (223 g.) is added all at once to a solution of sodium isopropoxide in isopropanol prepared by heating a mixture of 15.5 g. of metallic sodium in 600 ml. isopropanol under reflux for one hour with stirring. The resulting mixture is stirred and heated under reflux for 3.5 hours. Most of the solvent is evaporated under reduced pressure, and the residue is diluted with 600 ml. of water. The aqueous mixture is extracted twice with ether, and the combined ether extracts are extracted twice with 10% hydrochloric acid. The acid extracts are combined, made strongly basic with 40% sodium hydroxide, and the basic mixture is extracted several times with ether. The combined ether extracts are dried over anhydrous magnesium sulfate, the dried solution is evaporated to dryness on the steam bath, and the residue is distilled under reduced pressure to give α-amino-o-methylisobutyrophenone, B.P. 67–69° C./0.15 mm. Hg.

Example 2

To a solution of 251 g. of o-methylisobutyrophenone in 300 ml. of carbon tetrachloride is added 248 g. of bromine over a period of 45 minutes with efficient stirring. The reaction mixture is stirred for an additional 30 minutes, and most of the dissolved hydrogen bromide is removed by drawing a slow stream of air through the solution. The residue is then distilled under reduced pressure to give α-bromo-o-methylisobutyrophenone, B.P. 141–145° C./20 mm. Hg.

α-Bromo-o-methylisobutyrophenone (482 g.) is added rapidly with stirring to a refluxing solution of 46 g. of sodium dissolved in 2 liters of dry methanol. After the addition is complete, the mixture is refluxed for 8 minutes more and is then poured into 4 liters of crushed ice. The organic layer is extracted with three 1-liter portions of benzene, the benzene extracts are each quickly washed with 300 ml. of ice water, and the combined extracts are dried over anhydrous sodium sulfate. After evaporation of the benzene under reduced pressure, the oily residue is distilled under reduced pressure to give 1,2-epoxy-1-methoxy-2-methyl-1-(o-tolyl)-propane, B.P. 93–94° C./11 mm. Hg.

A pressure vessel is charged with 100 g. of ethylamine and 57.6 g. of the epoxy methyl ether prepared above. The mixture is heated at 175° C. for 24 hours, cooled, and washed from the reaction vessel with methanol. After evaporation of the methanol, the oily residue is dissolved in ether, and the ether solution is extracted with dilute hydrochloric acid. The acid extracts are washed with ether, made basic with an aqueous sodium hydroxide solution, and the basic solution is extracted with ether. The ether solution is washed thoroughly with water, dried over anhydrous potassium carbonate, and the dried solution is concentrated by evaporation under reduced pressure. Distillation of the residue gives α-ethylamino-o-methylisobutyrophenone, B.P. 84–87° C./0.18–0.21 mm. Hg.

The hydrochloride salt is prepared by treating a solution of the free base in dry ether with a solution of hydrogen chloride in isopropanol; M.P. 197.5–198.5° C.

Example 3

A solution of 16.3 g. of o-(1,2-epoxyisobutyl)-toluene, 8 ml. of ethylamine and 20 ml. of ethanol is heated in a sealed glass tube capable of withstanding high pressure for 8 hours at 175° C. The chilled mixture is removed from the tube and the solvent and excess ethylamine are removed by evaporation. A solution of the residual oil in ether is extracted with dilute hydrochloric acid and the ethereal phase is discarded. The hydrochloric acid solution is made basic with sodium hydroxide and extracted with several portions of ether. The dried ethereal extract is evaporated and the residue recrystallized from petroleum ether to give 1-(o-tolyl)-2-methyl-2-ethylamino-1-propanol. A solution of 10.3 g. of this product in 30 ml. of water containing 3 ml. of concentrated sulfuric acid is treated slowly with a solution of 5 g. of hydrated sodium dichromate in 30 ml. of water containing 7 ml. of concentrated sulfuric acid. Stirring at room temperature is continued for 6 hours, after which time the mixture is made basic and extracted successively with chloroform and with ether. The combined chloroform and ether extract is dired and treated with an excess of dry hydrogen chloride. The solvents are removed by distillation under reduced pressure and the residue is recrystallized from a mixture of isopropanol and ether to give the desired α-ethylamino-o-methylisobutyrophenone hydrochloride, M.P. 197.5–198.5° C.

The free base is obtained by making an aqueous solution of the hydrochloride basic with sodium hydroxide and extracting with ether.

A water-soluble citrate of α-ethylamino-o-methylisobutyrophenone is obtained by mixing methanolic solutions of the free base and citric acid, concentrating the mixture to a small volume, and isolating the precipitated salt by filtration.

The o-(1,2-epoxyisobutyl)-toluene used as starting material in the procedure of this example is prepared as follows: o-Methylisobutyrophenone (16.2 g.) is dissolved in 20 ml. of ether, and the solution is added dropwise with continuous stirring to a mixture of 4.0 g. of lithium aluminum hydride in 300 ml. of ether. The resulting mixture is gently heated for 2 hours, cooled and decomposed by the successive addition of 4 ml. of water, 3 ml. of 20% aqueous sodium hydroxide and 14 ml. of water. The mixture is then filtered, and the filtrate is evaporated to dryness to give 1-(o-tolyl)-2-methyl-1-propanol. This alcohol is dissolved in 250 ml. of toluene, 19.5 g. of p-toluenesulfonic acid is added, and the mixture is heated with stirring under a water trap until the theoretical amount of water is obtained. Upon cooling, the mixture is washed repeatedly with 5% aqueous sodium bicarbonate solution until neutral, and the solvent is removed by evaporation under reduced pressure to yield crude 1-(o-tolyl)-2-methyl-1-propene. This olefinic product is dissolved in about 200 ml. of chloroform and the solution is treated with 14 g. of perbenzoic acid at room temperature. After standing overnight, the mixture is thoroughly washed with 5% aqueous sodium bicarbonate solution to remove benzoic acid, and the solvent is evaporated under reduced pressure to give the desired o-(1,2-epoxyisobutyl-toluene.

I claim:

1. A compound chosen from the class consisting of α-ethylamino-o-methylisobutyrophenone of the formula

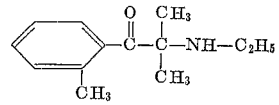

and non-toxic acid-addition salts thereof.

2. α-Ethylamino-o-methylisobutyrophenone.

3. Non-toxic acid-addition salts of α-ethylamino-o-methylisobutyrophenone.

4. α-Ethylamino-o-methylisobutyrophenone hydrochloride.

References Cited in the file of this patent

UNITED STATES PATENTS

| | | |
|---|---|---|
| 2,997,472 | Janssen | Aug. 22, 1961 |
| 3,068,236 | Krapcho | Dec. 11, 1962 |
| 3,068,283 | Kaiser et al. | Dec. 11, 1962 |
| 3,106,578 | Kaiser et al. | Oct. 8, 1963 |

FOREIGN PATENTS

| | | |
|---|---|---|
| 869,776 | Great Britain | June 7, 1961 |

OTHER REFERENCES

Holm et al.: "Acta Pharmacol. et Toxicol.", vol. 17, pp. 121–36 (1960).